Jan. 16, 1951 F. C. WRIGHT ET AL 2,538,070
MOUNTING ARRANGEMENT FOR ELECTRICAL APPARATUS
Filed Nov. 29, 1947 2 Sheets-Sheet 1

INVENTORS
FRANK C. WRIGHT
ALFRED C. DELAMARE
ALBERT E. J. RICHARDS
BY
Thomas J. H. Bryden
ATTORNEY Jan. 16, 1951 F. C. WRIGHT ET AL 2,538,070
MOUNTING ARRANGEMENT FOR ELECTRICAL APPARATUS
Filed Nov. 29, 1947 2 Sheets-Sheet 2
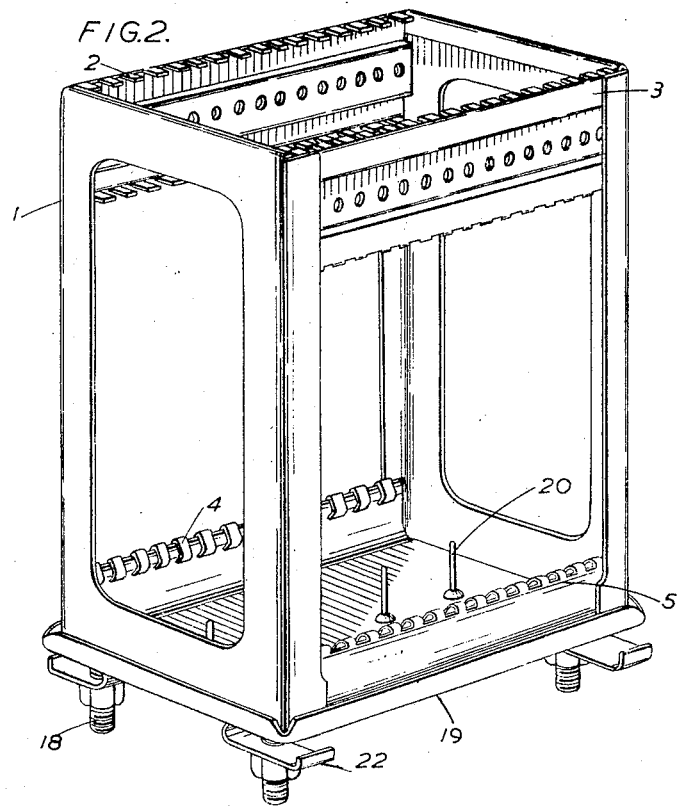
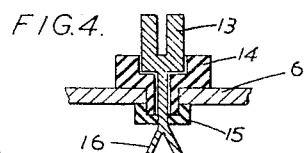
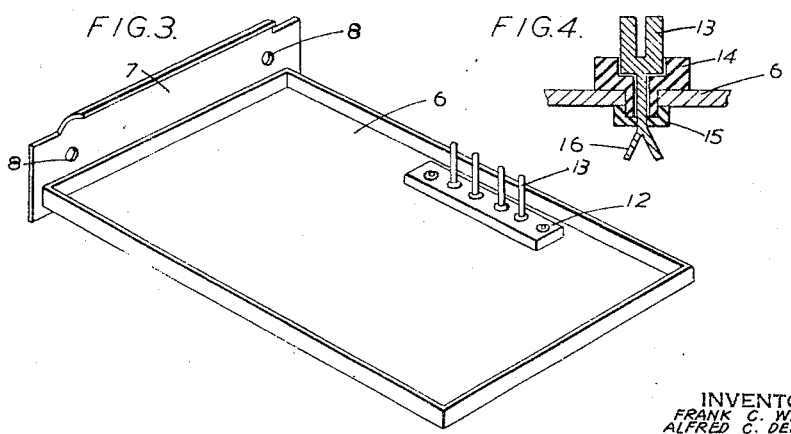
INVENTORS
FRANK C. WRIGHT
ALFRED C. DELAMARE
ALBERT E. J. RICHARDS
BY
Thomas H. Ryden
ATTORNEY Patented Jan. 16, 1951

2,538,070

UNITED STATES PATENT OFFICE 2,538,070

MOUNTING ARRANGEMENT FOR ELECTRICAL APPARATUS

Frank Coram Wright, Alfred Charles Delamare, and Albert Edward John Richards, London, England, assignors to International Standard Electric Corporation, New York, N. Y.

Application November 29, 1947, Serial No. 788,926
In Great Britain March 7, 1947

4 Claims. (Cl. 174—52)

The present invention relates to containers for small electrical apparatus, and is concerned with a design of container which may be easily adapted for enclosing a large variety of electrical circuit elements, or sub-assemblies of such elements, and which may, if desired, be hermetically sealed.

In the design of electrical communication equipment, it is becoming of increasing importance to utilise all the available mounting space in the most economical manner, while at the same time providing for simple and easily accessible assemblies, and quick replacement on the occurrence of faults.

It is the principal object of the present invention to provide a container for electrical apparatus and circuit elements which is standardised as far as possible in its dimensions and mechanical design and which houses the apparatus with the minimum wastage of space and with the maximum flexibility and accessibility. A few of such containers may be arranged to occupy substantially the whole of the available space on an apparatus panel, and may be mounted thereon in such a manner to render any one of them easily detachable for repairs, without disturbing any of the others or the wiring thereto.

The invention accordingly provides a metal container for electrical circuit elements, comprising a metal frame in the form of a rectangular parallelepiped, four parallel sides of which are provided with combs so as to form on each of two opposite faces of the said frame, racks so disposed that mounting plates for circuit elements can be slipped into corresponding spaces of the racks, a metal can enclosing the said frame, and terminals for the elements passing through insulating seals in a wall of the can.

The invention will be described with reference to the accompanying drawings, in which Fig. 1 shows a general perspective view of a container according to the invention, with parts broken away to show the internal details;

Fig. 2 shows a perspective view of the frame of the container to a somewhat smaller scale;

Fig. 3 shows a perspective view of one of the mounting plates which are shown in Fig. 1; and Fig. 4 is a fragmentary detail view of an alternative terminal mounting forming part of the apparatus illustrated in Figs. 1 through 3.

Figure 1:
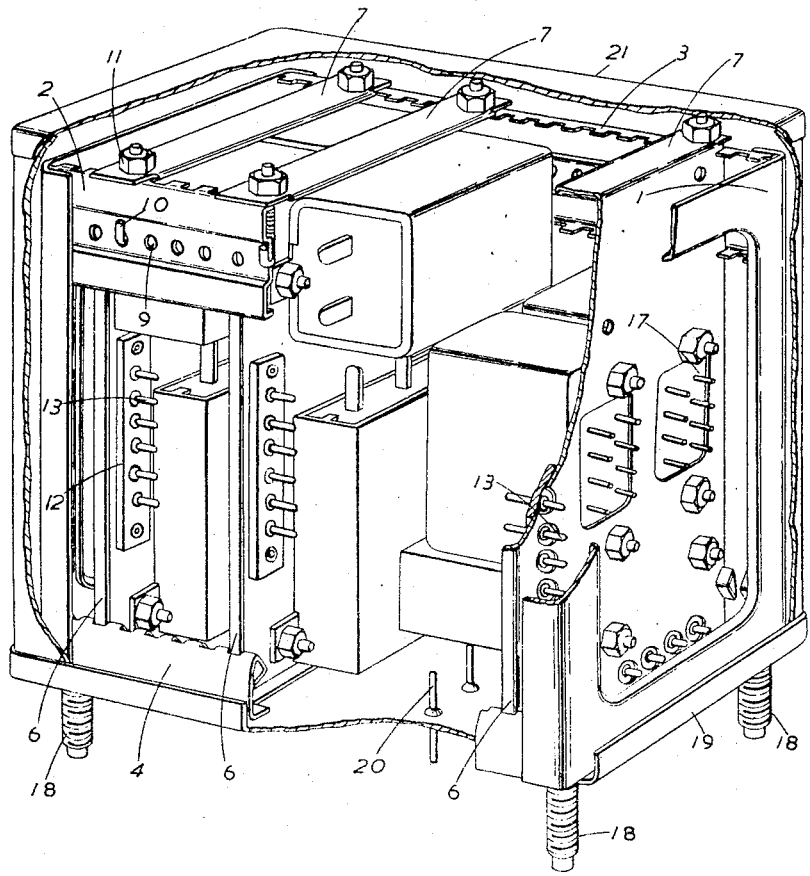

The container comprises an open main supporting frame 1 of rectangular parallelepiped form, of which two opposite upper side-plates 2 and 3 comprise double racks or combs of rectangular projections or teeth. The two corresponding lower side-plates 4 and 5 comprise single racks. The two rectangular end-plates of the frame may have their centre portions removed as shown, for lightness. The frame may be constructed by spot welding the upper and lower side-plates to the two end-plates.

The racks are adapted to support any number of similar metal mounting plates 6, of which three are shown in Fig. 1 and the general shape of which can be seen in Fig. 3. Each of these plates may be in the form of a shallow tray bent up from thin metal sheet for lightness and strength, and will be of such dimensions that it can be slipped into any of the corresponding spaces in the four racks, as shown in Fig. 1, and will thereby be firmly held in position. The two upper side-plates are preferably provided with two racks as shown, spaced apart sufficiently to guide the mounting plate into the corresponding spaces of the racks in the lower side plates. The tray has fixed thereto an end strip 7 having two fixing holes 8 by means of which it is secured to the frame. The upper side-plates have a row of holes 9, having the same spacing as the teeth of the racks, and the mounting plate is secured by means of a pair of hook screws 10 each of which is hooked through the nearest hole 9, the screw portion being fixed through the hole 8 by a nut 11.

The mounting plate is provided with a terminal strip 12 of insulating material having any desired number of terminals 13 which may conveniently project beyond the back of the plate through corresponding clearance holes, as may be seen from Fig. 1.

Alternatively, each terminal 13 may be separately mounted by insulating means in the mounting plate 6, in the manner shown, for example in Fig. 4. An insulating bush 14 extends through a hole in the plate 6, and a cup-shaped washer 15 of insulating material caps the projecting end of the bush 14, the whole being secured by the shank of the terminal 13 which extends through the central holes of the details 14 and 15. The shank is split at the end to form a fork 16 which is spread open after assembly, and holds all the parts together.

Each mounting plate may carry any desired assembly of electrical circuit elements such as condensers, resistances, transformers, rectifiers and the like, arranged in any convenient way. Such elements are indicated in Fig. 1. The mounting plates will be drilled with suitable fixing holes for the elements, and may be provided with any other clearance holes, as indicated for example, at 17 in Fig. 1. The elements on the plate may be wired to the terminals 13, thus forming a complete unit sub-assembly.

Rigidly fixed to the lower part of the frame are four fixing screws 18, of which only three can be seen in Fig. 1. These four screws also support and fix the bottom plate or wall 19 of a can which encloses the frame 1. The plate 19 carries a number of terminals 20 sealed therethrough by metal-to-glass seals by which the leads for the apparatus inside the container are brought out through the can. It is intended that the terminals 13 of the several mounting plates (and/or possibly terminals of the individual elements themselves) will be wired as necessary to the inside ends of the terminals 20.

The portion 21 of the enclosing can comprising the remaining five walls fits inside the upturned flange of the bottom plate 19, and may be fixed thereto in any suitable manner either removably, or not, as desired. The construction described, is however particularly adapted for the case in which the can is to be hermetically sealed. In this case the portion 21 should be sealed all round the edge to the portion 19 by solder or other like fusible metal, and all joints in the portion 21 itself should be likewise sealed. Furthermore, the bottom plate 19 should be sealed in the same way round the holes through which the screws 18 pass. A small hole (not shown) may be provided somewhere in one of the walls of the can by means of which the inside may be dried out with hot air or the like (and evacuated if desired) the hole being finally closed with solder.

A small clearance should preferably be allowed between the edges of the mounting plates 6 and the can walls to permit wires to run from the terminals 13 of any plate to the terminals 20. Alternatively, suitable clearance slots might be cut in the mounting plates.

It is to be noted that if the can is finally hermetically sealed, the elements mounted on the plates 6 need not be sealed into individual containers, but could be mounted bare on the plates. This saves a considerable amount of space and avoids the use of any sealing compound; and apart from saving the cost of the individual sealing and mounting of the elements, this also removes the well known difficulties arising from the changes and variations in the characteristics of the elements which are often caused by the sealing compound.

The container may be mounted on the apparatus panel by means of the screws 18. A preferred method is to employ cleats such as 22 (Fig. 2) by means of which the container may be clamped to bars or rails provided for the purpose on the panel. The container can then be quickly removed from the panel by loosening the clamping nuts without taking them right off. The nuts could therefore be imprisoned, if desired, by spinning over the ends of the screws, for example. It will be noted that since the screws 18 are secured to the frame of the container, the can, which is preferably of thin material, does not participate in the support of the apparatus, but is itself supported by the screws.

It should be pointed out that the container described may be constructed to hold various sizes and quantities of elements, while conforming to the space limitations of a particular size of apparatus panel, and at the same time, allowing a fair degree of standardisation of the component piece-parts. Thus, for example, the height of the frame 1 and the width of the end-plates will be determined by the apparatus panel, but the length of the side-plates 2, 3, 4, 5 is unrestricted (within fairly wide limits), and so it is possible to provide a range of containers of different lengths for which the end plates and the mounting plates will be identical, and also the end plates of the enclosing cans.

In the manufacture of the electrical equipment, particularly where there are large numbers of identical apparatus panels, the designing of the small sub-assemblies on individual mounting plates results in considerable simplification in the production and testing of the apparatus in large quantities, and the large variety of cable forms, often of complicated design, which are necessary with the conventional methods of mounting the circuit elements direct on the apparatus panel are avoided. Generally only a few quite simple cables are needed for connecting up the mounting plates to the terminals 17 of the container, as described without a complicated arrangement of "skinners" of various lengths, and likewise only simple cables are necessary for wiring up the containers when they are mounted on the apparatus panel.

It is to be further noted that by maintaining a small stock of spare containers of each type used in a station of a communication or other system, it will be extremely easy to replace a defective container by a spare one without interfering with any of the other adjacent containers, and in this way long interruptions of the service will not result from a fault. This may be a matter of great importance in a carrier current communication system, in which a fault may affect a large number of channels.

What is claimed is:

1. A metal container for electrical circuit elements comprising a metal frame in the form of a rectangular parallelepiped, each of two opposite sides of said frame having a pair of side-plates, one of said side-plates of each pair comprising a double comb of projections, the second sideplate of each pair comprising a single comb of projections corresponding to the projections in the first said side-plate, mounting trays for circuit elements, said trays being adapted to be supported by said combs, each said tray comprising an end strip having fixing holes, a terminal strip having terminals mounted by insulating means in said mounting tray, said double comb side-plates having holes spaced corresponding to said projections, screws having hooked portions adapted to engage said holes in said side-plates and having screw portions adapted to pass through said fixing holes in said terminal strip whereby said mounting trays are fixed firmly to said frame.

2. A metal container according to claim 1 in which said container comprises a can enclosing said frame, said can comprises a rectangular box having five metal walls and a bottom plate adapted to form a hermetically sealed can.

3. A metal container according to claim 2 in which said terminal strip comprises leads connected to said terminals and said bottom plate comprises terminals whereby said leads are brought out through the can.

4. A metal container according to claim 1 wherein said double combed projections are located at one end of said frame and said single combed projections are located at the other end of said frame.

FRANK CORAM WRIGHT.
ALFRED CHARLES DELAMARE.
ALBERT EDWARD JOHN RICHARDS.

REFERENCES CITED

The following references are of record in the file of this patent:

UNITED STATES PATENTS

| Number | Name | Date |
| --- | --- | --- |
| 1,750,246 | Serrell | Mar. 11, 1930 |
| 2,287,797 | Hanley | June 30, 1942 |